United States Patent
Jeong et al.

(10) Patent No.: US 8,543,115 B2
(45) Date of Patent: Sep. 24, 2013

(54) METHOD AND APPARATUS FOR SUPPORTING HANDOVER IN HETEROGENEOUS NETWORK

(75) Inventors: Su-Ryong Jeong, Yongin-si (KR); Seung-Hoon Choi, Suwon-si (KR); Sung-Eun Park, Seoul (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/353,613

(22) Filed: Jan. 19, 2012

(65) Prior Publication Data

US 2012/0190365 A1 Jul. 26, 2012

(30) Foreign Application Priority Data

Jan. 20, 2011 (KR) ........................ 10-2011-0005954

(51) Int. Cl.
*H04W 36/00* (2009.01)
(52) U.S. Cl.
USPC .......................................... 455/436; 370/331
(58) Field of Classification Search
USPC .................. 455/436, 449, 522; 370/331, 335
See application file for complete search history.

(56) References Cited

U.S. PATENT DOCUMENTS

2012/0100852 A1* 4/2012 Horn ............................ 455/436

FOREIGN PATENT DOCUMENTS

KR 10-2010-0092894 A 8/2010

OTHER PUBLICATIONS

Samsung, "System Performance of Heterogeneous Networks with Range Expansion", 3GPP TSG RAN WG1 Meeting #59bis, Jan. 12, 2010.
Alcatel-Lucent Shanghai Bell et al. "Cell Association for HetNet", 3GPP TSG RAN WG1 Meeting #62, Aug. 17, 2010.
Samsung, "Discussion on PCFICH Issue in Range Expansion", 3GPP TSG RAN WG1 Meeting #62, Aug. 17, 2010.

* cited by examiner

*Primary Examiner* — Phuoc Doan
(74) *Attorney, Agent, or Firm* — Jefferson IP Law, LLP

(57) ABSTRACT

A method for operating a terminal for supporting a handover in a heterogeneous network is provided. The method includes measuring received signal strength from a target small base station, so that a Signal-to-Noise Ratio (SNR) is estimated, when the SNR of the target small base station that considers a biased value for range expansion is greater than an SNR of a serving macro base station, determining whether an SNR of the target small base station that does not consider the biased value for the range expansion is equal to or less than a threshold, and when the SNR of the target small base station that does not consider the biased value for the range expansion is equal to or less than the threshold, transmitting indication information, informing that a low SNR is expected when the terminal performs a handover to the target small base station, to the serving macro base station.

18 Claims, 11 Drawing Sheets

METHOD AND APPARATUS FOR SUPPORTING HANDOVER IN HETEROGENEOUS NETWORK

PRIORITY

This application claims the benefit under 35 U.S.C. §119 (a) of a Korean patent application filed in the Korean Intellectual Property Office on Jan. 20, 2011 and assigned Serial No. 10-2011-0005954, the entire disclosure of which is hereby incorporated by reference.

BACKGROUND OF THE INVENTION

1. Field of the Invention

The present invention relates to a wireless communication system. More particularly, the present invention relates to a method and an apparatus for supporting a handover in a heterogeneous network.

2. Description of the Related Art

Recently, as demand for data communication and various communication services in a wireless communication system have increased, various alternatives for increasing a transmission capacity have been suggested. One alternative that is being developed is a technology for a heterogeneous network. The heterogeneous network denotes a communication system where base stations having various phases, cell coverage, and characteristics are mixed and operated.

FIG. 1 illustrates a heterogeneous network system according to the related art.

Referring to FIG. 1, the heterogeneous network denotes a system where a macro cell 100 having and one or more pico cells 102, 104, and 106 overlay and operate. In addition, though not illustrated in FIG. 1, the heterogeneous network may further include at least one femto cell inside the macro cell 100.

In the heterogeneous network, the small cells (i.e., the pico cells 102, 104, and 106 or the femto cell (not illustrated)) existing inside the macro cell 100 may reuse a transmission resource to increase a transmission capacity of an entire system. For example, in a case where one small cell having a transmission band of 10 MHz is installed based on the assumption that the macro cell 100 can utilize a transmission band of 10 MHz, a transmission band of 20 MHz in total may be secured. That is, in a case where N small cells are installed in one macro cell, a transmission band corresponding to N times an existing transmission band may be secured, and it may be expected that a transmission rate thus increases N times.

However, in an actual environment, even when N small cells are installed inside one macro cell, an N-times transmission rate cannot be obtained but a smaller transmission rate may be obtained due to interference between heterogeneous cells or a non-uniform distribution of terminals. That is, in an actual heterogeneous network system, performance deterioration may occur due to interference between a macro cell and a small cell, or interference between small cells. In addition, due to non-uniform distribution of terminals with respect to small cells, an unutilized resource may occur and thus performance deterioration may occur.

FIG. 2 illustrates a distribution of terminals in a heterogeneous network system according to the related art.

Referring to FIG. 2, in the heterogeneous network where a plurality of pico cells 211 to 213 exist inside a cell 202 of a macro base station 200, each of a plurality of terminals 220 to 224 measures signal strengths of respective cells to select a serving cell. Accordingly, as illustrated, a pico cell A 210 and a pico cell C 212 may allocate a resource to respective terminals 221 and 225 which have selected the pico cell A 210 and the pico cell C 212 as serving cells. However, a pico cell B 211 and a pico cell D 213 do not have a terminal that has selected the pico cell B 211 or the pico cell D 213 as a serving cell, so the pico cell B 211 and the pico cell D 213 cannot allocate a resource. Therefore, a transmittable resource amount increases due to the pico cell B 211 and the pico cell D 213, but improvement of an actual transmission rate is not achieved. That is, in a case where the number of pico cells that cannot allocate a resource to a terminal is large inside the heterogeneous network, transmission efficiency of the heterogeneous network is reduced.

Therefore, to overcome this disadvantage, recently, a range expansion technology for arbitrarily expanding a service area of a small base station having a narrow service area in the heterogeneous network to provide a service to a greater number of users has been developed. In more detail, in a case where a cell that should service a large number of terminals and a cell that services only an extremely small number of terminals are adjacent to each other, the range expansion technology gives a biased value to the cell that services only an extremely small number of terminals and allows the cell to be selected, so that all cells have an average service terminal distribution.

However, in a case where a relevant terminal selects a pico cell as a serving cell despite an excessively poor channel quality due to the range expansion technology, the relevant terminal may not receive a control signal or an essential broadcast channel due to low channel quality.

Therefore, a need exists for a method and an apparatus for efficiently supporting a handover in a heterogeneous network where a plurality of small cells overlap inside a macro cell.

SUMMARY OF THE INVENTION

Aspects of the present invention are to address at least the above-mentioned problems and/or disadvantages and to provide at least the advantages described below. Accordingly, an aspect of the present invention is to provide a method and an apparatus of a handover for increasing a transmission capacity in a heterogeneous network system.

Another aspect of the present invention is to provide a method and an apparatus for reducing power consumed after a terminal performs a handover in a heterogeneous network system.

Still another aspect of the present invention is to provide a method and an apparatus for providing, at a base station, a signal and a service to a handover terminal when a range expansion and muting subframe technology is applied in a heterogeneous network system.

Yet another aspect of the present invention is to provide a method and an apparatus for signal exchange and procedure, for allowing a base station to apply a range expansion and for muting subframe technology with a neighbor base station when the range expansion and muting subframe technology is applied in a heterogeneous network system.

In accordance with an aspect of the present invention, a method for operating a terminal for supporting a handover in a heterogeneous network is provided. The method includes measuring received signal strength from a target small base station to estimate a Signal-to-Noise Ratio (SNR), when the SNR of the target small base station that considers a biased value for range expansion is greater than an SNR of a serving macro base station, determining whether an SNR of the target small base station that does not consider the biased value for the range expansion is equal to or less than a threshold, and when the SNR of the target small base station that does not consider the biased value for the range expansion is equal to or less than the threshold, transmitting indication information informing that a low SNR is expected when the terminal performs a handover to the target small base station, to the serving macro base station.

In accordance with another aspect of the present invention, a method for operating a macro base station for supporting a handover in a heterogeneous network is provided. The method includes, when a terminal performs a handover to a target small base station, receiving indication information informing that a low SNR is expected from the terminal, when the terminal performs a handover to the target small base station, transmitting at least one of information regarding the terminal for which a low SNR is expected and muting subframe information to the target small base station, and receiving resource allocation information for the terminal for which the low SNR is expected from the target small base station.

In accordance with still another aspect of the present invention, a method for operating a target small base station for supporting a handover in a heterogeneous network is provided. The method includes, when a terminal performs a handover to the target small base station, receiving at least one of information regarding the terminal for which a low SNR is expected and muting subframe information from a serving macro base station, and transmitting resource allocation information for the terminal for which the low SNR is expected to the serving macro base station.

In accordance with further another aspect of the present invention, a terminal apparatus for supporting a handover in a heterogeneous network is provided. The terminal apparatus includes a channel estimator for measuring received signal strength from a target small base station to estimate a SNR, and a controller for, when the SNR of the target small base station that considers a biased value for range expansion is greater than an SNR of a serving macro base station, determining whether an SNR of the target small base station that does not consider the biased value for the range expansion is equal to or less than a threshold, and when the SNR of the target small base station that does not consider the biased value for the range expansion is equal to or less than the threshold, for transmitting indication information, informing that a low SNR is expected when the terminal performs a handover to the target small base station, to the serving macro base station.

In accordance with yet another aspect of the present invention, a macro base station apparatus for supporting a handover in a heterogeneous network is provided. The macro base station apparatus includes a controller for, when a terminal performs a handover to a target small base station, receiving indication information informing that a low SNR is expected from the terminal, when the terminal performs a handover to the target small base station, for transmitting at least one of information regarding the terminal for which a low SNR is expected and muting subframe information to the target small base station, and for receiving resource allocation information for the terminal for which the low SNR is expected from the target small base station.

In accordance with still yet another aspect of the present invention, a target small base station apparatus for supporting a handover in a heterogeneous network is provided. The target small base station apparatus includes a controller for, when a terminal performs a handover to the target small base station, receiving at least one of information regarding the terminal for which a low SNR is expected and muting subframe information from a macro base station, and for transmitting resource allocation information for the terminal for which the low SNR is expected to the macro base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components, and structures.

DETAILED DESCRIPTION OF EXEMPLARY EMBODIMENTS

Figure 1:
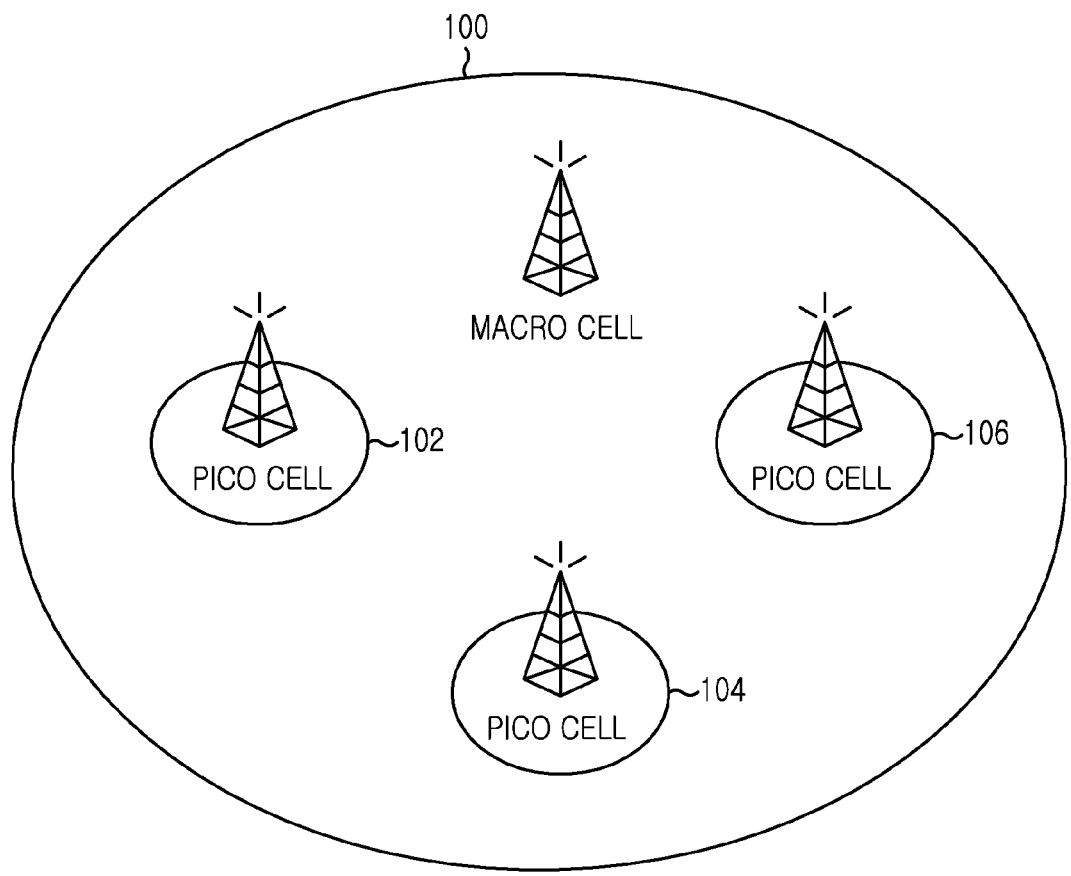
FIG. 1 is a view illustrating a heterogeneous network system according to the related art.
Figure 2:
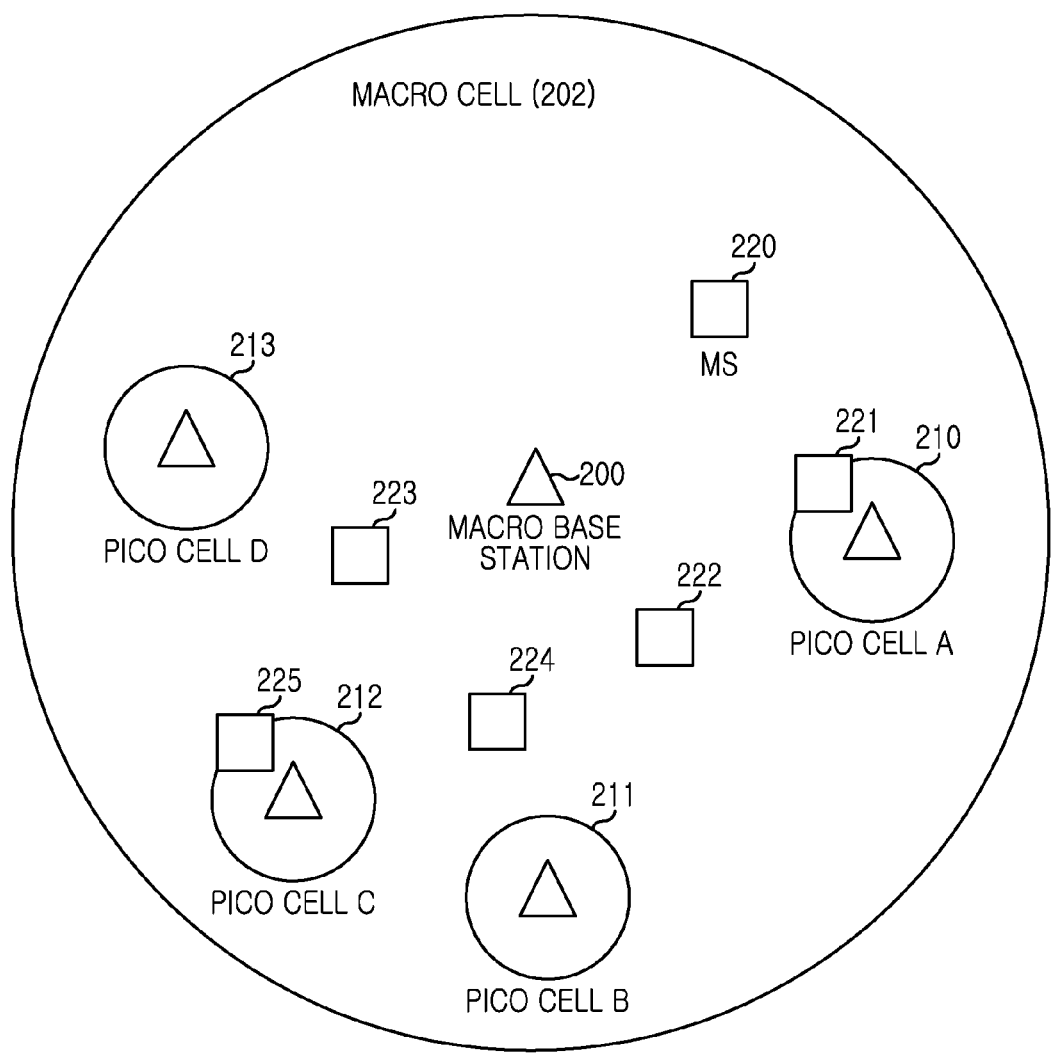
FIG. 2 is a view illustrating an example of a distribution of terminals in a heterogeneous network system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for supporting a handover in a heterogeneous network. More particularly, exemplary embodiments of the present invention provide a method and an apparatus for receiving, in advance, selective subframe information at a handover target base station from an existing serving base station when performing a handover to a cell having a lower quality channel according to a range expansion technology to allow an efficient handover and transmission/reception in a heterogeneous network.

FIGS. 3 through 8, discussed below, and the various exemplary embodiments of the present invention are by way of illustration only and should not be construed in any way that would limit the scope of the disclosure. Those skilled in the art will understand that the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Hereinafter, exemplary embodiments of the present invention consider an environment where a terminal using a base station inside a macro cell as a serving base station performs a handover to a base station inside a pico cell.

Figure 3:
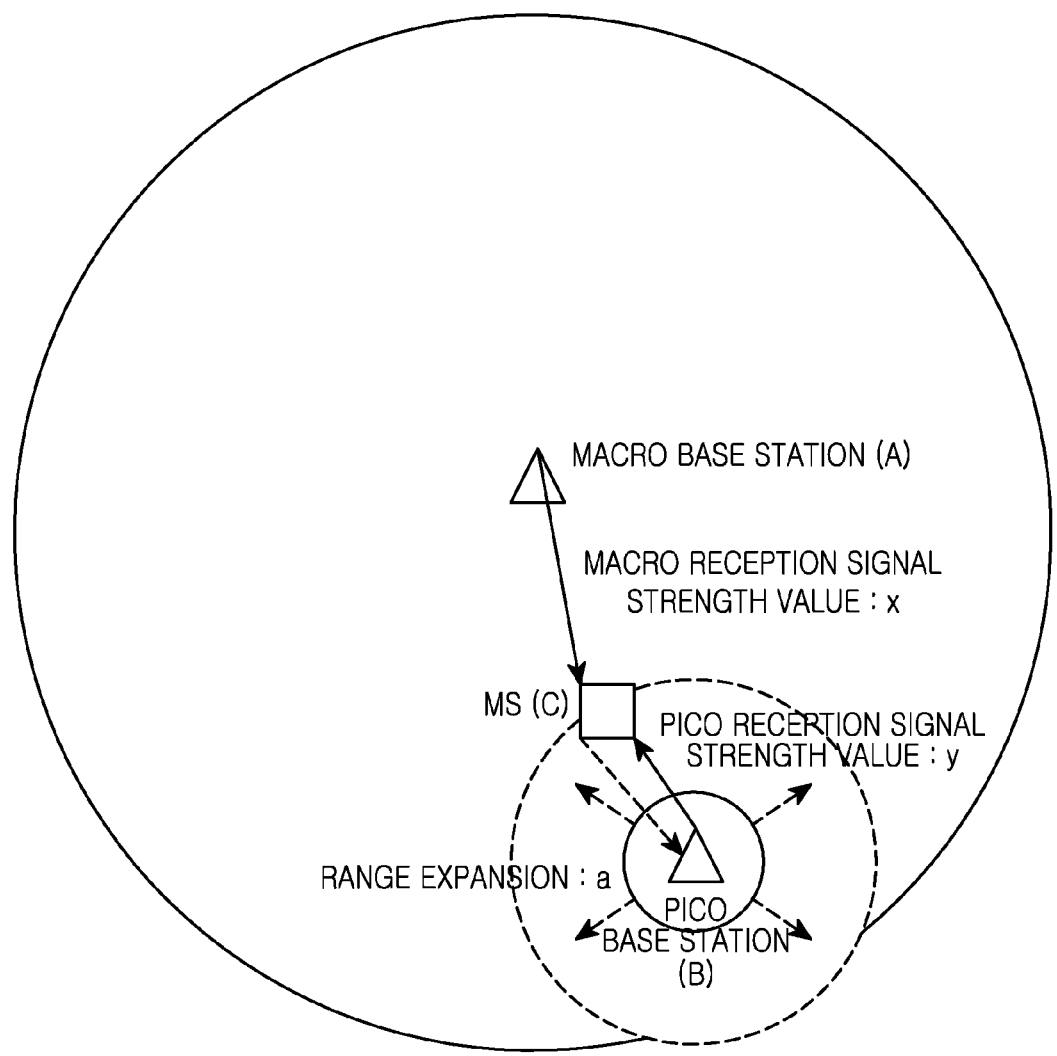
FIG. 3 is a view illustrating a case where a range expansion technology is applied and a service area is expanded according to an exemplary embodiment of the present invention.

FIG. 3 illustrates a range expansion concept according to an exemplary embodiment of the present invention.

Referring to FIG. 3, it is assumed that a cell that services a relatively wide area and has a large number of terminals to service in a relevant region is a macro cell A, and a cell that services a relatively narrow area and has a small number of terminals to service in a relevant region is a pico cell B. In addition, it is assumed that a terminal that should select a certain cell of both cells between the cell A and the cell B is a terminal C. Strengths of reception signals received from the cell A and cell B are set to x and y, respectively.

In this case, according to the related art, the terminal C selects a cell having better strength among the signal strengths x and y. That is, when x>y, the terminal C selects the cell A. When x<y, the terminal C selects the cell B. However, when the cell B applies range expansion and a biased value thereof is a, if x>y+a, the terminal C should select the cell A. Otherwise, if x<y+a, that is, if the signal strength of the cell B is not better than that of the cell A but the biased value a is large, the terminal C should select the cell B. When the range expansion is applied, although the relevant terminal may be allocated a better channel from the cell A, in the case where the relevant cell A has no service band to provide for the terminal C, the terminal is allowed to select the cell B even though the cell B has a poor channel state, so that the terminal is allocated a relatively larger service band and so a system performance improves.

Meanwhile, an interference coordination technique for limiting interference between adjacent cells by transmitting a signal with low power or limiting signal transmission with respect to a specific subframe or a specific subband/subchannel in an interference cell is introduced.

Figure 4A:
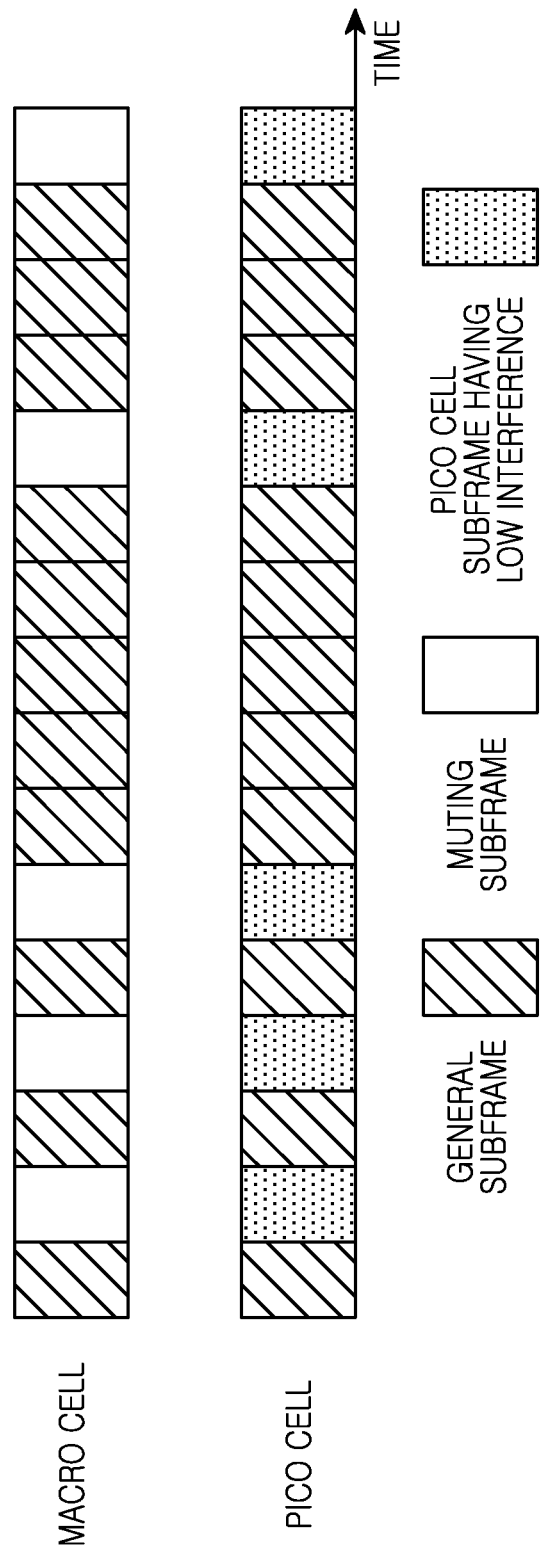
FIGS. 4A and 4B illustrate interference coordination between adjacent cells according to an exemplary embodiment of the present invention.
Figure 4B:
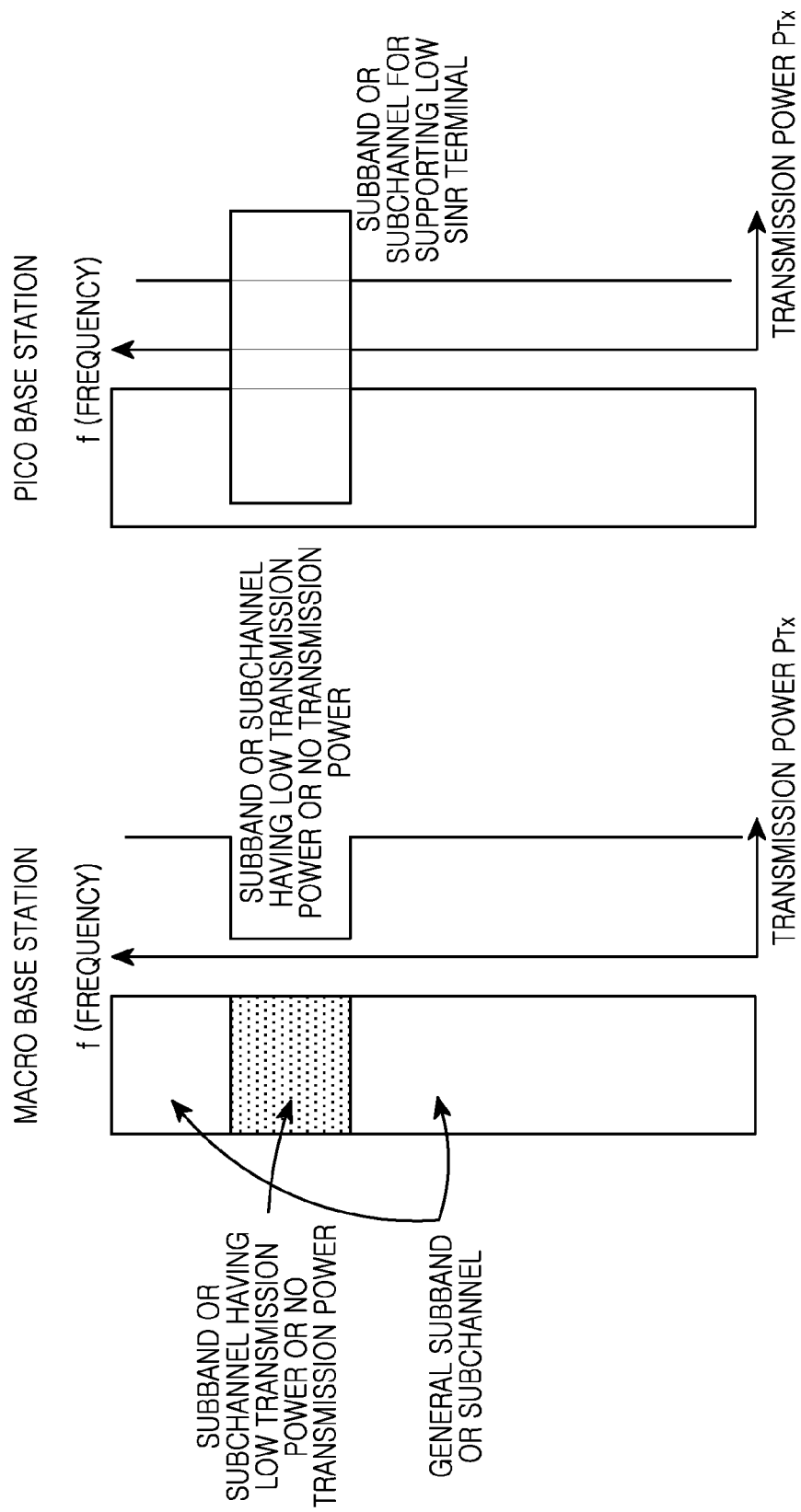

FIGS. 4A and 4B illustrate interference coordination between adjacent cells according to an exemplary embodiment of the present invention.

Referring to FIG. 4A, a macro base station does not transmit a signal via a specific subframe (hereinafter, referred to as a 'muting subframe'), so that interference at a pico cell is reduced. That is, when the macro cell does not transmit a signal during a muting subframe, the pico cell experiences low interference during the muting subframe of the macro cell.

Referring to 4B, a method for allowing a macro base station to transmit a signal having low power in a specific subband or limit signal transmission to achieve interference coordination in a frequency band is exemplarily illustrated.

Exemplary embodiments of the present invention provide an apparatus and a method for a handover, capable of efficiently improving system performance and simultaneously reducing power consumption of a terminal under an environment utilizing an interference coordination technique that uses a range expansion technology and a muting subframe in a heterogeneous network.

Figure 5:
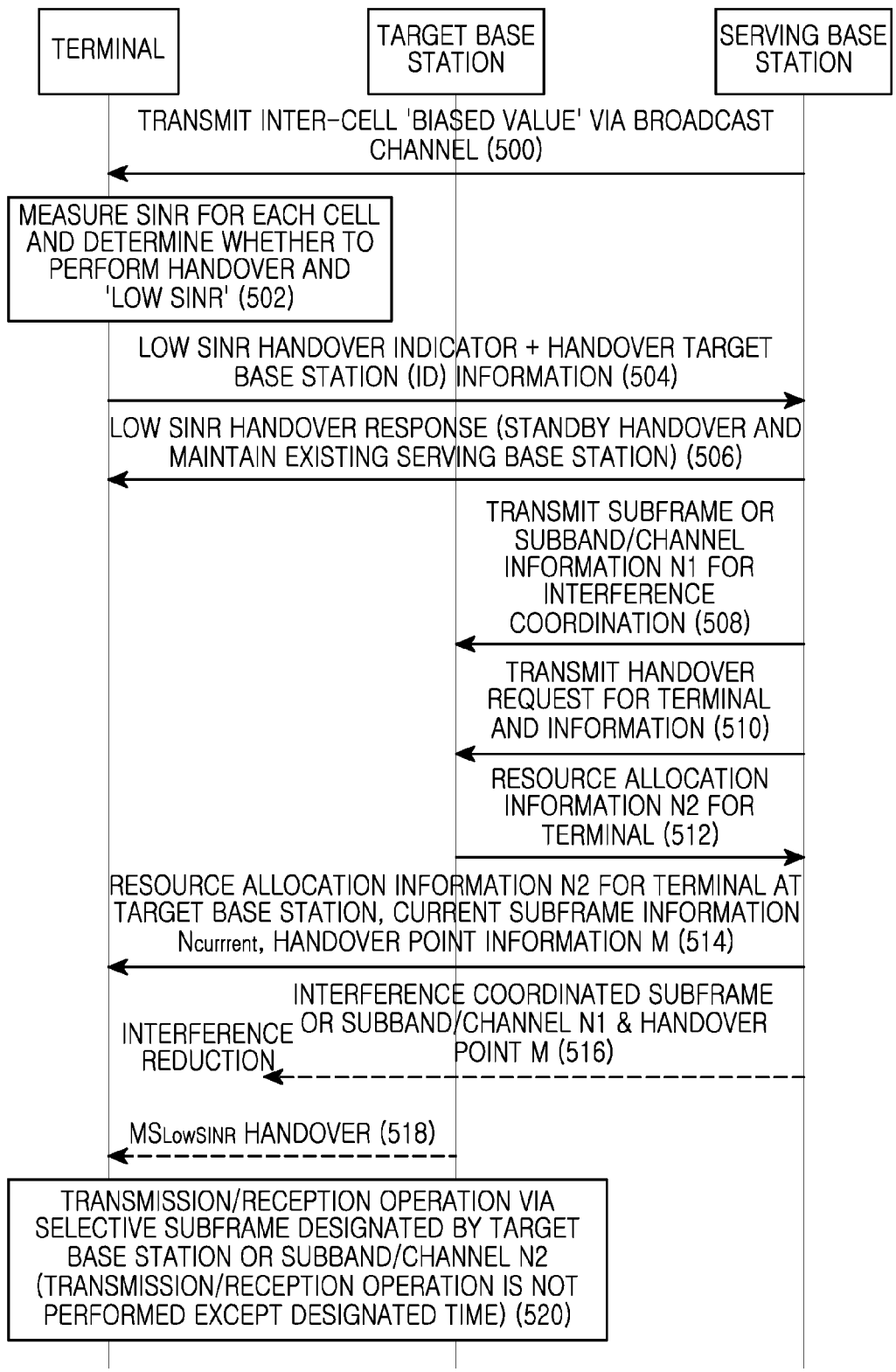
FIG. 5 is a view illustrating a signal flow for supporting a handover in a heterogeneous network system according to an exemplary embodiment of the present invention.

FIG. 5 is a view illustrating a signal flow for supporting a handover in a heterogeneous network system according to an exemplary embodiment of the present invention.

Referring to FIG. 5, a terminal receives biased value information for controlling a handover between a macro cell and a pico cell (that is, determining range expansion of a pico cell) periodically or non-periodically from a serving base station (that is, a macro base station) in step 500. Here, the biased value information denotes a correction value that should be considered when cells that may serve as a candidate group selectable as a serving base station and a terminal between relevant cells select a serving base station based on terminals inside a relevant cell. The biased value information is information which the serving base station transmits to all terminals inside a cell via a broadcast channel.

Also, the serving base station transmits a $threshold_{low\ expected\ SINR}$ for determining whether received signal strength or a Signal-to-Interference and Noise Ratio (SINR) from a handover target base station (that is, a pico base station) is equal to or less than a preset range via a broadcast channel (not illustrated). At this point, the threshold may be replaced by a system parameter value fixed at an initial setting of a terminal. As a result, this prevents a circumstance where the terminal selects a pico cell as a serving cell even though a channel of the pico cell is poor when the region of the pico cell expands by the biased value as in FIG. 3, so that a control signal, a broadcast channel, and the like that should be essentially received cannot be received due to a low channel quality of the pico cell.

Thereafter, the terminal that has obtained a threshold regarding a biased value between neighbor cells and an SINR adds a biased value to reception signal channel information with candidate base stations and the serving base station to select a cell to which the terminal is to perform a handover in step 502. Here, the reception signal channel information may be a received signal strength estimation value from each base station, or an SINR value from each base station may be measured and utilized.

When signal strength of the serving base station is smaller than received signal strength to which a biased value of a specific neighbor base station (that is, a pico base station) has been applied, the terminal needs to perform a handover from the serving base station to the target base station. However, according to an exemplary embodiment of the present invention, when received signal strength that does not reflect a biased value of a specific neighbor base station is expected to be low i.e., below the threshold, to prevent a circumstance where a control signal, a broadcast channel, and the like. that should be essentially received cannot be received, the terminal transmits a handover request message including "handover target cell or target base station identifier information" and information of an "indicator (hereinafter, referred to as a "low expected SINR indicator") informing a terminal for which a low SINR is expected when the terminal performs a handover to a pico cell", or a separate handover request message to the serving base station in step 504. Otherwise, the terminal transmits an existing handover request signal or follows the handover procedure. Here, the "low expected SINR indicator" indicates that a connection between the terminal and the serving base station is maintained further inside the macro cell due to the low SINR although the terminal should immediately perform a handover to a pico cell inside the macro cell.

That is, when $Threshold_{low\ expected\ SINR} > SINR_{Target\ Cell}$, a handover request message including "handover target cell or target base station identifier information", and "low expected SINR indicator" information is transmitted.

When $Threshold_{low\ expected\ SINR} \leq SINR_{Target\ Cell}$, the handover procedure is performed.

Herein, $Threshold_{low\ expected\ SINR}$ is a threshold which the terminal has received from a serving base station, and $SINR_{Target\ Cell}$ is signal strength of a target base station to which a biased value is not applied.

When receiving a handover request message including "handover target cell or target base station identifier information" and "low expected SINR indicator" information in step 504, the serving base station transmits a handover response message to the terminal in step 506. The handover response message informs the terminal that the serving base station has received the handover request message and simultaneously requests the serving base station to continue to maintain communication with the terminal until the target base station prepares a swift service for the terminal via information exchange and negotiation between the serving base station and the target base station.

The serving base station additionally transmits information of a point/period of an interference coordinated subframe (that is, a muting subframe) for neighbor base stations, or a subband/subchannel (hereinafter, referred to as N1) to neighbor base stations including the target base station in step 508. That is, the serving base station lowers power temporarily or transmits information regarding signal transmission limitation to the neighbor base stations including the target base station with respect to a specific point for reducing an inter-cell interference temporarily or a subframe or a specific subband/subchannel.

Also, the serving base station transmits information regarding the terminal for which a low SINR is expected due to range expansion of a pico cell to the target base station in step 510.

In an exemplary implementation, information regarding a muting subframe transmitted in step 508 and handover information regarding the terminal transmitted in step 510 may be transmitted via one control message.

Thereafter, when receiving handover information of a terminal of a low SINR (that is, a terminal that continues to maintain a connection with a base station inside a macro cell though the terminal should perform a handover to a pico cell inside the macro cell), the target base station transmits a point/period of a subframe to be provided to the low SINR terminal, or subband/subchannel information (that is, resource allocation information, hereinafter referred to as N2) to the serving base station with consideration of a point/period of the interference coordinated subframe (muting subframe) of the serving base station or a subband/subchannel information in step 512.

The serving base station transmits radio resource information N2 including an index (referred to as $N_{current}$) of a current subframe and a handover point (referred to as M), allocated for the terminal by the target base station, to the terminal in step 514.

The index $N_{current}$ of the current subframe is a reference value for allowing the terminal to perform a point at which the terminal performs a handover and the target base station to allocate resource allocation information N2 to the terminal without confusion. In a case where the target base station and the terminal can recognize the handover point M and the resource allocation information N2 simultaneously, the index $N_{current}$ information of the current subframe may be omitted. Also, here, the handover point M may be a muting subframe N1 interference-coordinated such that an amount of interference at the serving base station is small for swift handover of the terminal, or a subframe corresponding to resource allocation information N2 allocated by the target base station in step 516.

The terminal performs a handover at a handover point M based on information of $N_{current}$, M, N2 in step 518, and performs transmission/reception via only a subframe N2 allocated by the target base station in step 520. Since the terminal performs transmission/reception via only the subframe N2 allocated by the target base station, the terminal does not consume power during the remaining subframes.

Meanwhile, the terminal is less interfered by the serving base station at a handover point M at which the terminal performs a handover to the target base station in step 516.

As described above, when the terminal expected to perform a handover to a pico cell with a low SINR transmits an indicator thereof, the serving base station transmits information regarding the terminal to the target base station.

Thereafter, the serving base station transmits a radio resource, for example, information N1 regarding a muting subframe to the target base station with respect to a subframe corresponding to N1=4n+1 (n is an arbitrary integer). Next, the target base station selects a subframe to be allocated to the terminal as N2=8n+1 (one time whenever N1 occurs two times) with consideration of N1 subframe information, a load rate inside a relevant cell, a channel state, and the like, and transmits N2 information to the serving base station. Thereafter, the serving base station transmits a current subframe index $N_{current}$, a handover point M, and subframe information N2 allocated to the terminal by the target base station to the terminal. The terminal performs a handover to the target base station at the point M, and then performs a transmission/reception operation during a subframe corresponding to N2, that is, with respect to only a subframe corresponding to N2=8n+1.

Figure 6A:
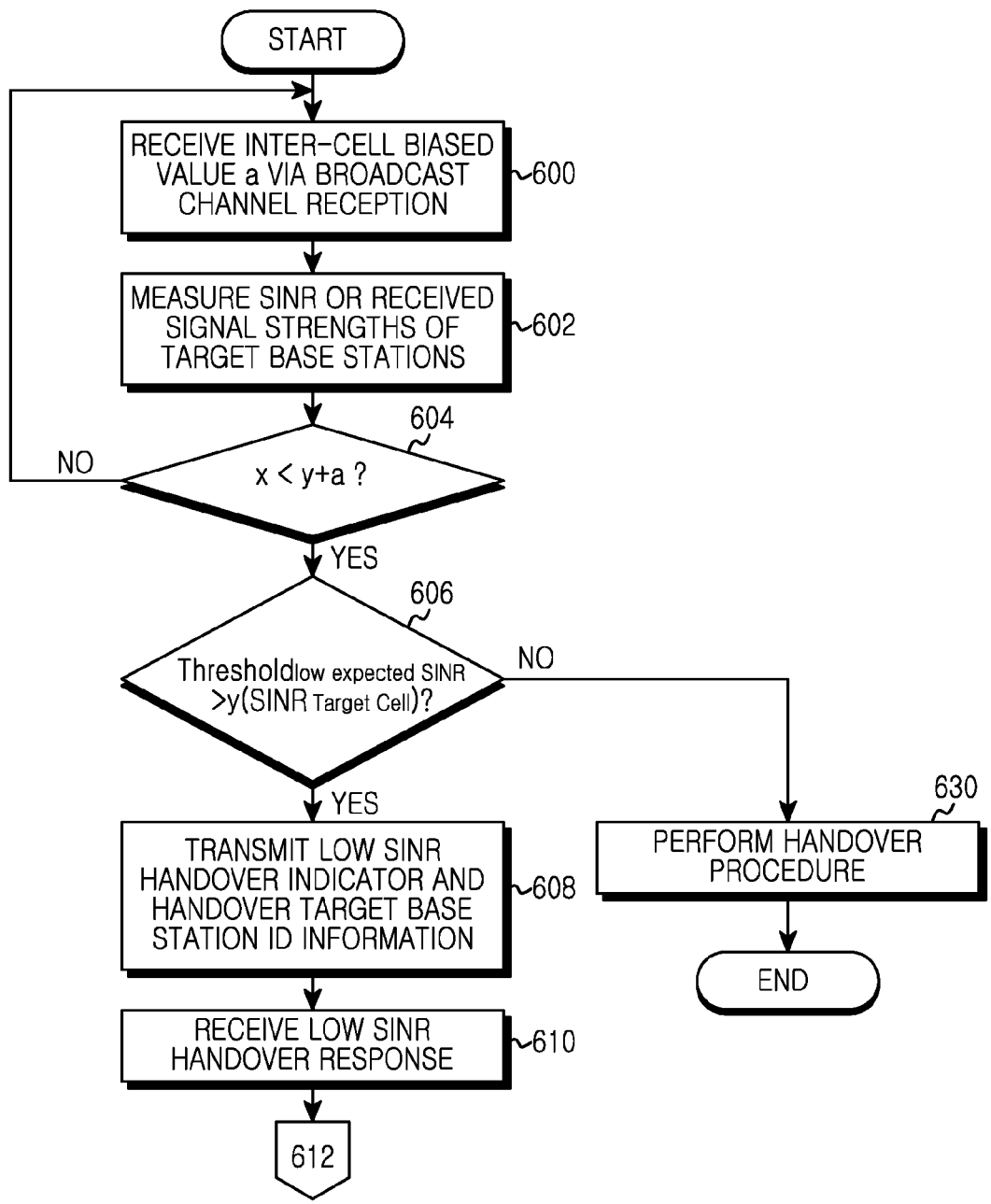
FIGS. 6A and 6B are flowcharts illustrating a method for operating a terminal for supporting a handover in a heterogeneous network system according to an exemplary embodiment of the present invention.
Figure 6B:
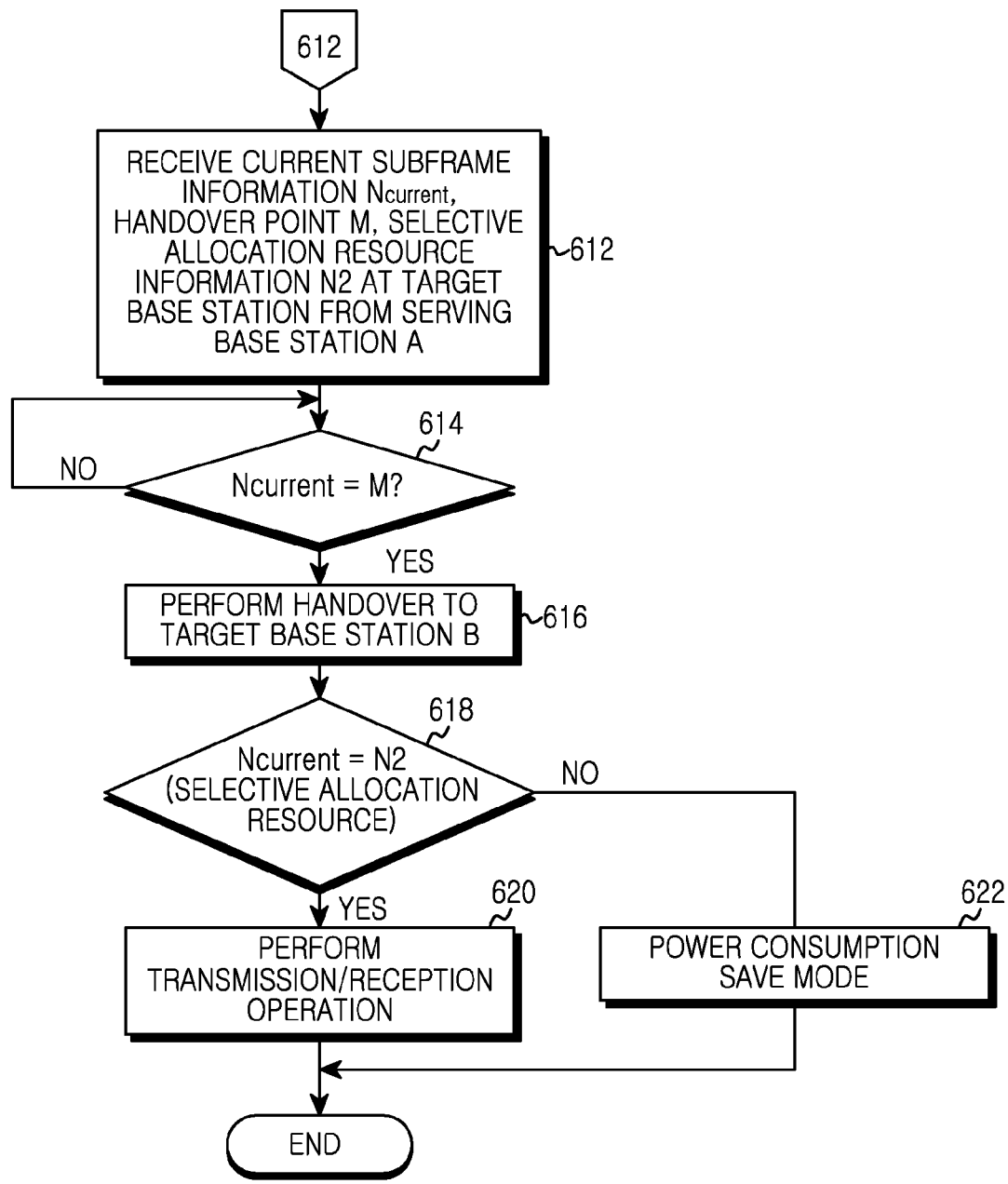

FIGS. 6A and 6B are flowcharts illustrating a method for operating a terminal for supporting a handover in a heterogeneous network system according to an exemplary embodiment of the present invention.

Referring to FIGS. 6A and 6B, the terminal receives each inter-cell biased value a via a broadcast channel in step 600, and measures SINRs or received signal strengths of respective selectable candidate base stations to determine whether a handover is required in step 602. At this point, to determine whether a handover is required, a biased value a is considered.

To determine a handover, when received signal strength or an SINR x from the serving base station is smaller than the sum of received signal strength or an SINR y and the biased value a in step 604, the terminal proceeds to step 606 to compare a threshold$_{low\ expected\ SINR}$ received from the serving base station with a received SINR of the target base station.

When the received SINR of the target base station is equal to or less than the threshold, the terminal proceeds to step 608 to transmit an indicator informing that the terminal maintains a low SINR with the target base station and handover target base station identifier information to the serving base station. Otherwise, the terminal proceeds to step 630 to perform the handover procedure. For example, the terminal performs a handover from the serving base station (that is, a macro base station) to the target base station.

Meanwhile, since the received SINR from the target base station is equal to or less than the threshold, the terminal transmits a low handover indicator and handover target base station identifier information, and then receives a handover response message from the serving base station in step 610, and does not perform a handover to the target base station but continues to maintain a connection with the serving base station.

The terminal receives current subframe information $N_{current}$, a handover point M, resource information N2 allocated to the terminal by the target base station from the serving base station in step 612.

When the current subframe becomes the handover point M in step 614, the terminal proceeds to step 616 to perform a handover to the target base station.

When the current subframe coincides with the subframe N2 allocated by the target base station in step 618, the terminal proceeds to step 620 to perform a transmission/reception operation with the target base station. Otherwise, the terminal proceeds to step 622 to reduce power consumption by not performing a transmission/reception operation.

Figure 7:
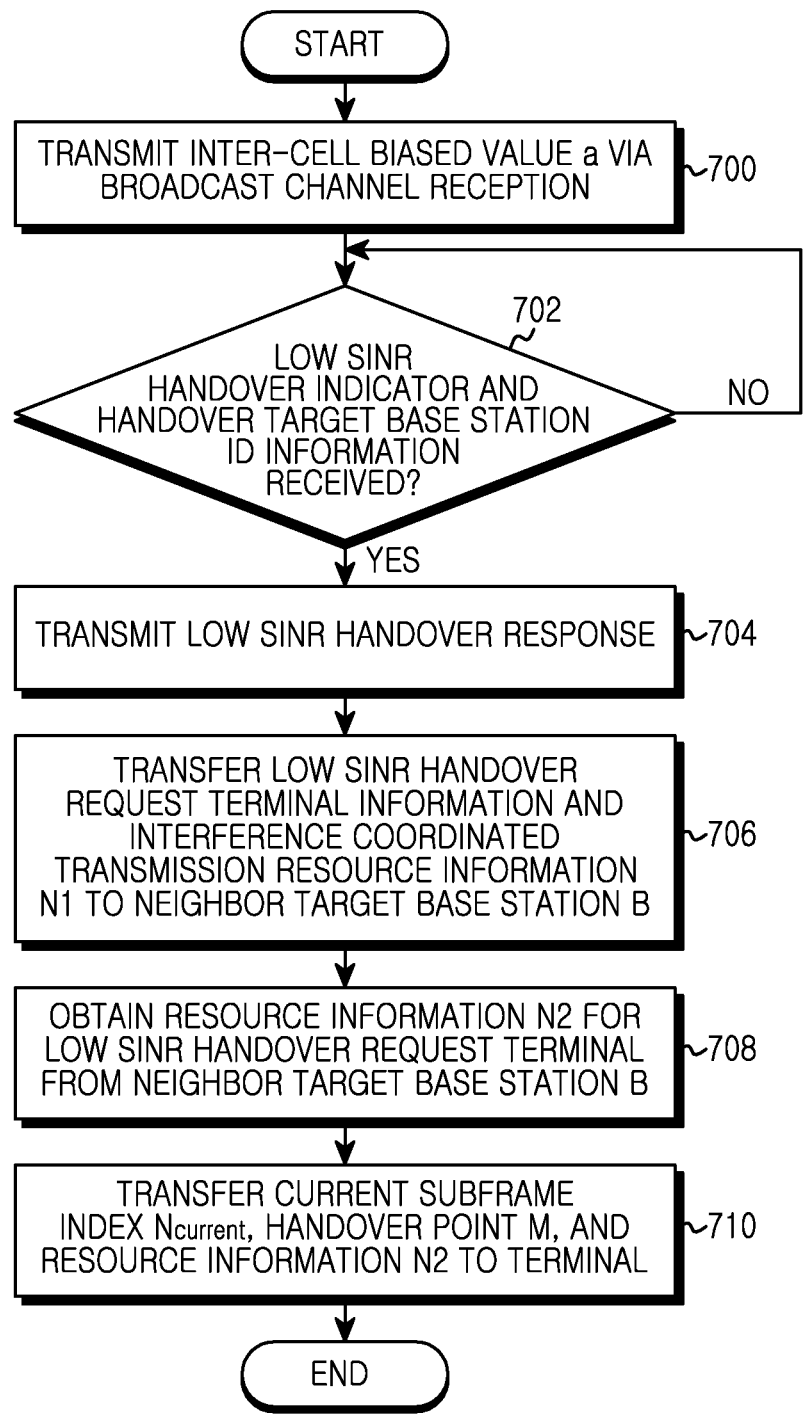
FIG. 7 is a flowchart illustrating a method for operating a serving base station for supporting a handover in a heterogeneous network system according to an exemplary embodiment of the present invention.

FIG. 7 is a flowchart illustrating a method for operating a serving base station for supporting a handover in a heterogeneous network system according to an exemplary embodiment of the present invention.

Referring to FIG. 7, the serving base station transmits a biased value for range expansion of a pico cell via a broadcast channel in step 700. The serving base station determines whether an indicator informing that a low SINR is expected when a handover to a pico cell is performed and handover target base station identifier information are transmitted from a terminal in step 702.

When the terminal that transmits the indicator and the target base station identifier information exists, the serving base station proceeds to step 704 to transmit a handover response message to the terminal so that the terminal may continue to maintain a connection with the serving base station.

The serving base station transfers information of a terminal that has requested a low SINR handover with respect to the target base station and interference coordinated transmission resource N1 (muting subframe) information to the target base station in step 706, and receives resource allocation information N2 for a low SINR handover request terminal from the target base station in step 708. The serving base station transmits a current subframe index $N_{current}$, a handover point M, and resource allocation information N2 to the terminal in step 710, so that the terminal performs a handover at the relevant handover point M. That is, the serving base station induces the terminal to swiftly transmit/receive a signal from the target base station, and efficiently consume power.

Figure 8:
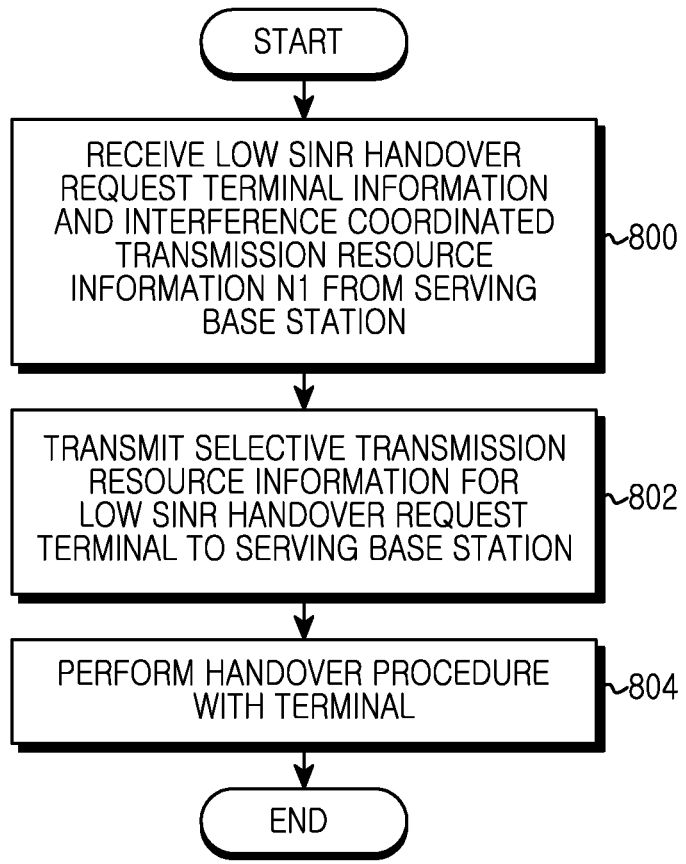
FIG. 8 is a flowchart illustrating a method for operating a target base station for supporting a handover in a heterogeneous network system according to an exemplary embodiment of the present invention.

FIG. 8 is a flowchart illustrating a method for operating a target base station, for supporting a handover in a heterogeneous network system according to an exemplary embodiment of the present invention.

Referring to FIG. 8, the target base station receives low SINR handover request terminal information (that is, terminal information indicating that the terminal continues to maintain a connection with a serving base station temporarily due to a low SINR though the terminal should perform a handover to the target base station) and muting subframe information N1 from the serving base station in step 800.

The target base station transmits resource allocation information for a low SINR handover request terminal to the serving base station in step 802.

The target base station performs a handover request from the terminal in step 804. The target base station may request the terminal to perform a handover.

Figure 9:
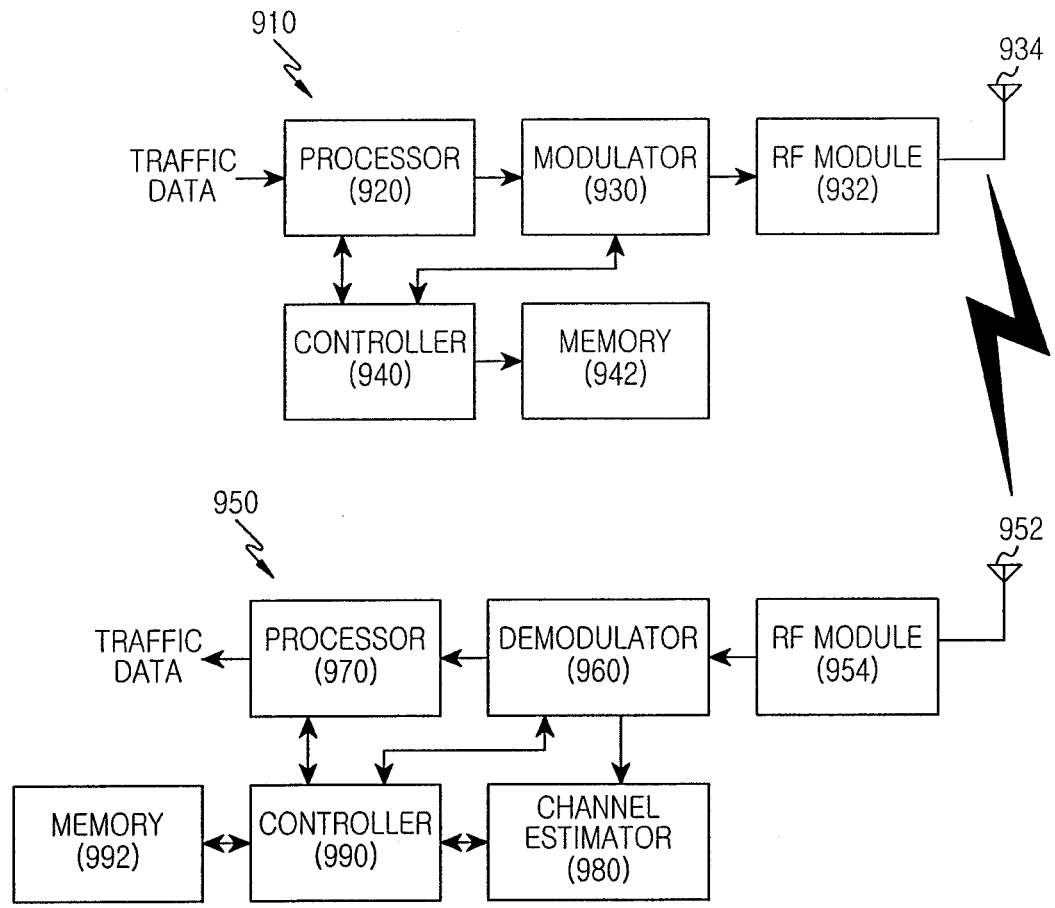
FIG. 9 is a block diagram illustrating a base station apparatus and a terminal apparatus according to an exemplary embodiment of the present invention.

FIG. 9 is a block diagram illustrating a base station apparatus and a terminal apparatus according to an exemplary embodiment of the present invention.

In a downlink, a transmitter and a receiver are a part of a base station or a terminal. That is, in an uplink, a transmitter is a part of a terminal, and a receiver is a part of a base station. Conversely, in a downlink, a transmitter is a part of the base station, and a receiver is a part of the terminal.

Referring to FIG. 9, in a transmitter, a processor 920 encodes, interleaves, and symbol-maps data (for example, traffic data and signaling) to generate data symbols. Also, the processor 920 generates pilot symbols to multiplex data symbols and pilot symbols. A modulator 930 generates a suitable transmission symbol depending on a wireless access method. A Radio Frequency (RF) module 932 processes (for example, analog conversion, amplification, filtering, and frequency up-conversion) the transmission symbol to generate an RF signal transmitted via a transmission antenna 934.

In a receiver, an antenna 952 receives a signal transmitted from a transmitter to provide the same to an RF module 954. The RF module 954 processes (for example, filtering, amplification, frequency down-conversion, digitalization) a received signal to provide input samples. A demodulator 960 demodulates the input samples to provide a data value and a pilot value. A channel estimator 980 derives a channel estimation value based on received pilot values. The demodulator 960 performs data detection (equalization) on received data values using the channel estimation value, and provides a data symbol estimation value for a transmitter. The processor 970 symbol-demaps, deinterleaves, and decodes data symbol estimation values, and provides decoded data. Generally, in a receiver, processes by the demodulator 960 and the processor 970 are mutually cooperated with the processes of the modulator 930 and the processor 920 at a transmitter, respectively.

Controllers 940 and 990 control operations of various processing modules in the transmitter and the receiver. Specifically, the controllers 940 and 990 perform a digital signal processing process and control operations of various processing modules in order to perform an operation related to an exemplary embodiment of the present invention described with reference to the drawings. Memories 942 and 992 store program codes and data for the transmitter and the receiver.

In the above-described embodiments, elements and characteristics of the present invention combine in a predetermined form. Each element or characteristic should be considered as selective unless clearly mentioned separately. Each element or characteristic may be embodied in a form that does not combine with other elements or characteristics. Also, some of elements and/or characteristics may combine to form an embodiment of the present invention. A sequence of operations described in the embodiment of the present invention may change. A partial configuration or characteristic of a certain embodiment may be included in a different embodiment, and may be replaced by a configuration or characteristic corresponding to a different embodiment. It is obvious to combine claims having no clear citation to form an embodiment in patent claims or include a new claim by amendment after filing.

Exemplary embodiments of the present invention may be implemented by various means, for example, hardware, firmware, software, and a combination thereof. In a case of using hardware, an exemplary embodiment of the present invention may be implemented using one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a micro controller, a micro processor, and the like.

In a case of using software, an exemplary embodiment of the present invention may be implemented in the form of a module, a procedure, and a function that performs the above-described functions or operations. A software code may be stored in a memory unit and driven by a processor. The memory unit is located inside or outside the processor to give and take data to/from the processor via various known means.

As described above, in a heterogeneous network system, only a subframe where a good channel is possible is selectively received by range expansion technology during a handover to a cell having a lower quality channel, so that power consumption of a terminal is prevented and transmission efficiency of an entire system increases.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal for supporting a handover in a heterogeneous network, the method comprising:
   measuring received signal strength from a target small base station to estimate a Signal-to-Noise Ratio (SNR);
   when the SNR of the target small base station that considers a biased value for range expansion is greater than an SNR of a serving macro base station, determining whether an SNR of the target small base station that does not consider the biased value for the range expansion is equal to or less than a threshold; and
   when the SNR of the target small base station that does not consider the biased value for the range expansion is equal to or less than the threshold, transmitting indication information, informing that a low SNR is expected when the terminal performs a handover to the target small base station, to the serving macro base station.

2. The method of claim 1, further comprising, when the SNR of the target small base station that does not consider the biased value for the range expansion is greater than the threshold, performing a handover to the target small base station.

3. The method of claim 1, further comprising:
   receiving, at the terminal, at least one of muting subframe information, a handover point, resource information allocated to the terminal by the target small base station, and current subframe information;
   performing a handover to the target small base station at the handover point; and
   after performing the handover to the target small base station, transmitting/receiving data to/from the target small base station based on the resource information allocated to the terminal by the target base station.

4. The method of claim 3, wherein the resource information allocated to the terminal by the target small base station and the handover point are determined based on the muting subframe information.

5. The method of claim 1, further comprising, after the transmitting of the indication information, informing that the low SNR is expected when the terminal performs a handover to the target small base station, to the serving macro base station, receiving information indicating maintenance of a connection between the terminal and the serving macro base station from the serving macro base station.

6. The method of claim 1, further comprising receiving a biased value for the range expansion and the threshold from the serving macro base station.

7. A method for operating a macro base station for supporting a handover in a heterogeneous network, the method comprising:
   when a terminal performs a handover to a target small base station, receiving indication information informing that a low Signal-to-Noise Ratio (SNR) is expected from the terminal;
   when the terminal performs a handover to the target small base station, transmitting at least one of information regarding the terminal for which the low SNR is expected and muting subframe information to the target small base station;
   receiving resource allocation information for the terminal for which the low SNR is expected from the target small base station; and
   transmitting at least one of the muting subframe information, a handover point, resource allocation information for the terminal, and current subframe information to the terminal.

8. The method of claim 7, further comprising transmitting information indicating maintenance of a connection between the terminal and the macro base station to the terminal.

9. The method of claim 7, wherein the resource allocation information for the terminal and the handover point are determined based on the muting subframe information.

10. A terminal apparatus for supporting a handover in a heterogeneous network, the terminal apparatus comprising:
    a channel estimator for measuring received signal strength from a target small base station to estimate a Signal-to-Noise Ratio (SNR); and
    a controller for, when the SNR of the target small base station that considers a biased value for range expansion is greater than an SNR of a serving macro base station, determining whether an SNR of the target small base station that does not consider the biased value for the range expansion is equal to or less than a threshold, and when the SNR of the target small base station that does not consider the biased value for the range expansion is equal to or less than the threshold, for transmitting indication information, informing that a low SNR is expected when the terminal performs a handover to the target small base station, to the serving macro base station.

11. The terminal apparatus of claim 10, wherein, when the SNR of the target small base station that does not consider the biased value for the range expansion is greater than the threshold, the controller performs a handover to the target small base station.

12. The terminal apparatus of claim 10, wherein the controller receives at least one of muting subframe information, a handover point, resource information allocated to the terminal by the target small base station, and current subframe information, performs a handover to the target small base station at the handover point, and transmits/receives data to/from the target base station based on the resource information allocated to the terminal by the target base station after performing the handover to the target small base station.

13. The terminal apparatus of claim 12, wherein the resource information allocated to the terminal by the target small base station and the handover point are determined based on the muting subframe information.

14. The terminal apparatus of claim 10, wherein the controller transmits indication information informing that a low SNR is expected when the terminal performs a handover to the target small base station, and receives information indicating maintenance of a connection between the terminal and the serving macro base station from the serving macro base station.

15. The terminal apparatus of claim 10, wherein the controller receives the biased value for the range expansion and the threshold from the serving macro base station.

16. A macro base station apparatus for supporting a handover in a heterogeneous network, the macro base station apparatus comprising:
   a controller for, when a terminal performs a handover to a target small base station, receiving indication information informing that a low Signal-to-Noise Ratio (SNR) is expected from the terminal, when the terminal performs a handover to the target small base station, for transmitting at least one of information regarding the terminal for which the low SNR is expected and muting subframe information to the target small base station, and for receiving resource allocation information for the terminal for which the low SNR is expected from the target small base station,
   wherein the controller transmits at least one of the muting subframe information, a handover point, resource allocation information for the terminal, and current subframe information to the terminal.

17. The macro base station apparatus of claim 16, wherein the controller transmits information indicating maintenance of a connection between the terminal and the macro base station to the terminal.

18. The macro base station apparatus of claim 17, wherein the resource allocation information for the terminal and the handover point are determined based on the muting subframe information.

* * * * *